United States Patent
Sugihara et al.

(10) Patent No.: US 8,664,313 B2
(45) Date of Patent: Mar. 4, 2014

(54) METHOD FOR PRODUCING AQUEOUS ETHYLENE/VINYL ALCOHOL BASED COPOLYMER DISPERSION

(75) Inventors: Norihiro Sugihara, Hyogo (JP); Yuhei Funabiki, Hyogo (JP)

(73) Assignee: Sumitomo Seika Chemicals Co., Ltd., Hyogo (JP)

(*) Notice: Subject to any disclaimer, the term of this patent is extended or adjusted under 35 U.S.C. 154(b) by 1376 days.

(21) Appl. No.: 11/596,355

(22) PCT Filed: May 13, 2005

(86) PCT No.: PCT/JP2005/008784
§ 371 (c)(1),
(2), (4) Date: Dec. 10, 2007

(87) PCT Pub. No.: WO2005/111118
PCT Pub. Date: Nov. 24, 2005

(65) Prior Publication Data
US 2008/0176989 A1    Jul. 24, 2008

(30) Foreign Application Priority Data

May 14, 2004   (JP) ................................ 2004-145410

(51) Int. Cl.
*C08K 5/05*   (2006.01)
*C08L 29/04*  (2006.01)
*C08F 6/10*   (2006.01)

(52) U.S. Cl.
USPC ........... 524/379; 523/340; 524/389; 524/503; 524/803

(58) Field of Classification Search
USPC .......... 524/379, 389, 503, 557, 803; 523/332, 523/340
See application file for complete search history.

(56) References Cited

U.S. PATENT DOCUMENTS 3,347,811 A * 10/1967 Bissot ........................... 524/563
3,689,445 A *  9/1972 Hopwood et al. ............ 524/503
4,220,543 A *  9/1980 Yamashita ................ 210/500.36
4,269,713 A *  5/1981 Yamashita et al. ....... 210/500.23

FOREIGN PATENT DOCUMENTS

| JP | 54-101844 A | 8/1979 |
| JP | 56-61430 A | 5/1981 |
| JP | 4-225008 A | 8/1992 |
| JP | 5-179001 A | 7/1993 |
| JP | 11-193340 A | 7/1999 |
| JP | 2001234019 | * 8/2001 |
| JP | 2001270946 | * 10/2001 |
| WO | WO-03/025058 A1 | 3/2003 |
| WO | WO 03025058 | * 3/2003 |

OTHER PUBLICATIONS

Supplemental European Search Report issued in related European Application No. EP 05 73 8577 on Apr. 24, 2009.
XP002525120 (for JP2001270946) Oct. 2, 2001.
XP002525121 (for JP2001234019) Aug. 28, 2001.

* cited by examiner

*Primary Examiner* — Fred M Teskin
*Assistant Examiner* — Marie Reddick
(74) *Attorney, Agent, or Firm* — Novak Druce Connolly Bove + Quigg LLP

(57) ABSTRACT

The present invention provides a method of producing, in an industrially advantageous manner, an ethylene/vinyl alcohol copolymer aqueous dispersion which has a high concentration and is excellent in long-term storage stability and in which the resin particles in the aqueous dispersion obtained are small in particle diameter. The method of the present invention relates to producing an ethylene/vinyl alcohol copolymer aqueous dispersion, which comprises: (1) a step of dissolving an ethylene/vinyl alcohol copolymer in a mixed solvent comprising 5 to 65% by weight of water and 35 to 95% by weight of a water-soluble organic solvent, with heating, (2) a step of cooling a solution obtained in step (1) to precipitate the ethylene/vinyl alcohol copolymer, (3) a step of reducing a concentration of the water-soluble organic solvent in the mixed solvent to a level lower than 35% by weight relative to the total amount of the water and water-soluble organic solvent by adding water, and (4) a step of distilling off the water-soluble organic solvent.

7 Claims, No Drawings

METHOD FOR PRODUCING AQUEOUS ETHYLENE/VINYL ALCOHOL BASED COPOLYMER DISPERSION

CROSS-REFERENCE TO RELATED APPLICATIONS

This application is a National Stage of PCT/JP2005/008784 filed May 13, 2005 which in turn claims priority from Japanese Application 2004-145410, filed May 14, 2004.

TECHNICAL FIELD

The present invention relates to a method of producing an ethylene/vinyl alcohol copolymer aqueous dispersion.

BACKGROUND ART

Ethylene/vinyl alcohol copolymers (hereinafter referred to as "EVOHs" for short) obtained by saponifying ethylene/vinyl acetate copolymers or the like are particularly excellent in gas barrier properties against oxygen and so forth, odor retaining capacity, oil resistance and chemical resistance, so that they are adequately used in the form of various moldings such as films, sheets and containers. Further, they have attracted attention also as protective coating materials for metal surfaces, paper, wood and the like. In particular, they are greatly superior in gas barrier properties to other resins and, therefore, are very useful as materials for food packaging films, sheets, laminates, hollow containers and so forth which are required to be effective in inhibiting the contents thereof from being oxidized and in odor retention.

As for the general methods of molding EVOH into films, sheets and the like, the method comprising melt extrusion molding or injection molding of EVOH and the method comprising EVOH film lamination are widely practiced. On the other hand, a method has been proposed which comprises application of a solution of EVOH dissolved in a solvent or an aqueous dispersion of EVOH, followed by drying, since when such is used, relatively thin coat films can be formed and coat films can be formed with ease even on articles complicated in form and shape, for example hollow containers.

However, there are problems: with the increasing concentration, the EVOH solution increases in viscosity and becomes difficult to use, and the solvent is a mixed solvent comprising such an organic solvent as dimethyl sulfoxide or an alcohol and water, so that the working environment may be deteriorated by the organic solvent evaporating in the coat film formation process and an apparatus for organic solvent recovery is required to an economical disadvantage. On the contrary, the method comprising application of an aqueous dispersion of EVOH uses water as the dispersion medium and therefore is considered and expected to be advantageous from the working environment and economical viewpoint.

Known as the method of producing aqueous EVOH dispersions are, among others, the method comprising dissolving, with heating, EVOH in the presence of an alcohol, water and a surfactant, followed by emulsifying/dispersing while removing the alcohol (Patent Document 1), the method comprising dissolving EVOH in a hydrophilic solvent, emulsifying/dispersing the EVOH in a precipitating agent, collecting the aggregate by filtration and redispersing the same using a basic substance (Patent Document 2) and the method comprising emulsifying/dispersing a copolymer in which the EVOH component and an ionic group-containing component are bound together in a block—or graft-like manner and which is insoluble in water at ordinary temperature (Patent Document 3). However, the aqueous dispersions obtainable are low in concentration and insufficient in storage stability.

Also known is a method which comprises concentrating the resin component by centrifugation in the course of producing aqueous EVOH dispersions (Patent Document 4), for instance, however, the process is complicated and uneconomical, and the aqueous dispersion obtained cannot be said to be satisfactory in long-term storage stability.

Further, a method comprising melt-mixing EVOH with a dispersing agent using a twin-screw extruder, followed by dispersion in water (Patent Document 5), for instance, is known, however, there is a problem that the particles in the aqueous dispersion obtained are great in particle diameter.

Patent Document 1: Japanese Kokai Publication Sho-54-101844
Patent Document 2: Japanese Kokai Publication Sho-56-61430
Patent Document 3: Japanese Kokai Publication Hei-4-225008
Patent Document 4: Japanese Kokai Publication Hei-5-179001
Patent Document 5: Japanese Kokai Publication Hei-11-193340

DISCLOSURE OF THE INVENTION

Problems which the Invention is to Solve

It is an object of the present invention to provide a method of producing, in an industrially advantageous manner, an ethylene/vinyl alcohol copolymer aqueous dispersion which has a high concentration and is excellent in long-term storage stability and in which the resin particles in the aqueous dispersion obtained are small in particle diameter.

Means for Solving the Object

Thus, the present invention relates to a method of producing an ethylene/vinyl alcohol copolymer aqueous dispersion, which comprises: (1) a step of dissolving an ethylene/vinyl alcohol copolymer in a mixed solvent comprising 5 to 65% by weight of water and 35 to 95% by weight of a water-soluble organic solvent, with heating, (2) a step of cooling a solution obtained in said step to precipitate the ethylene/vinyl alcohol copolymer, (3) a step of reducing a concentration of the water-soluble organic solvent in said mixed solvent to a level lower than 35% by weight relative to the total amount of the water and water-soluble organic solvent by adding water, and (4) a step of distilling off said water-soluble organic solvent.

Effect of the Invention

In accordance with the present invention, an ethylene/vinyl alcohol copolymer aqueous dispersion which has a high concentration and is excellent in long-term storage stability and in which the resin particles in the aqueous dispersion obtained are small in particle diameter can be produced in an industrially advantageous manner.

BEST MODES FOR CARRYING OUT THE INVENTION

In accordance with the present invention, an ethylene/vinyl alcohol copolymer dispersion is first produced by dissolving, with heating, an ethylene/vinyl alcohol copolymer in a mixed solvent composed of water and a water-soluble organic solvent and then cooling the solution obtained to precipitate the ethylene/vinyl alcohol copolymer.

The ethylene/vinyl alcohol copolymer (hereinafter referred to as "EVOH" for short) is obtained by copolymerizing ethylene with a vinyl ester such as vinyl acetate, vinyl formate, vinyl propionate, vinyl benzoate, vinyl trifluoroacetate or vinyl pivalate, followed by saponification. Thus, more specifically, it includes saponified substances of ethylene/vinyl acetate copolymer, saponified substances of ethylene/vinyl formate copolymer, saponified substances of ethylene/vinyl propionate copolymer, saponified substances of ethylene/vinyl benzoate copolymer, saponified substances of ethylene/vinyl trifluoroacetate copolymer and saponified substances of ethylene/vinyl pivalate copolymer, among others. A copolymerizable monomer other than ethylene and vinyl esters may be copolymerized at a level not higher than 5 mole percent according to need.

The ethylene content in EVOH is desirably 15 to 65 mole percent, preferably 20 to 55 mole percent. In cases where the ethylene content is lower than 15 mole percent, the resulting aqueous dispersion may possibly be insufficient in storage stability. When the ethylene content is above 65 mole percent, the gas barrier properties of the coat film obtained from the aqueous dispersion may possibly become insufficient. The ethylene content in EVOH so referred to herein can be determined from a $^1$H-NMR or $^{13}$C-NMR spectrum measured in the dimethyl sulfoxide solvent.

The degree of saponification of EVOH is desirably not lower than 80 mole percent, preferably not lower than 95 mole percent, more preferably not lower than 97 mole percent. When the degree of saponification is lower than 80 mole percent, the coat film or layer obtained from the ethylene/vinyl alcohol copolymer aqueous dispersion may possibly be insufficient in gas barrier properties. The degree of saponification of EVOH so referred to herein can be determined, for example, by the method comprising assaying the unsaponified acetyl group content by neutralization titration with a sodium hydroxide solution in a water/phenol mixed solvent (weight ratio: 15/85).

It is desired that the degree of polymerization of EVOH be generally not lower than 400, preferably 700 to 5000, although the higher that degree is, the more advantageous it is in application use as aqueous dispersions. If the degree of polymerization is lower than 400, the coatings obtained from the corresponding ethylene/vinyl alcohol copolymer aqueous dispersion will be unfavorably low in strength. The degree of polymerization of EVOH so referred to herein can be determined from the intrinsic viscosity measured at 30° C. in water/phenol mixed solvent (weight ratio: 15/85).

As the water-soluble organic solvent mentioned above, there may be mentioned monohydric alcohols such as methyl alcohol, ethyl alcohol, n-propyl alcohol, isopropyl alcohol and tert-butyl alcohol; dihydric alcohols such as ethylene glycol and propylene glycol; trihydric alcohols such as glycerin; phenols such as phenol and cresols; amines such as ethylenediamine and trimethylenediamine; dimethyl sulfoxide, dimethylacetamide and N-methylpyrrolidone, among others. Among them, methyl alcohol, ethyl alcohol, n-propyl alcohol, isopropyl alcohol and tert-butyl alcohol are properly used since when these are used, the resin particles in the EVOH aqueous dispersion obtained are small in particle diameter and the aqueous dispersion is excellent in storage stability. The water-soluble organic solvents mentioned above may be used singly or in the form of a mixture of two or more of them.

The concentration of the water-soluble organic solvent in the mixed solvent comprising water and the water-soluble organic solvent is 35 to 95% by weight, preferably 40 to 90% by weight, more preferably 40 to 87% by weight, relative to the total weight of the water and water-soluble organic solvent. When the concentration of the water-soluble organic solvent is outside the above range, the affinity for EVOH may decrease, making dissolution difficult and, in some instances, EVOH particles are aggregated with one another on the occasion of precipitation.

On the occasion of dissolving EVOH in the mixed solvent comprising water and a water-soluble organic solvent, the concentration of EVOH is 1 to 35% by weight, preferably 1 to 25% by weight, relative to the total amount of the mixed solvent and EVOH. EVOH concentrations lower than 1% by weight uneconomically lead to decreases in volumetric efficiency. When the EVOH concentration is above 35% by weight, the viscosity of the solution becomes high, possibly resulting in difficulty in dissolving.

In the practice of the present invention, it is preferred that an ethylene/α,β-unsaturated carboxylic acid copolymer neutralized with a base be used as a dispersion stabilizer to improve the dispersion stability of EVOH particles. By this, it becomes possible to attain good dispersion stability of EVOH particles on the occasion of precipitation by cooling and on the occasion of distilling off the solvent and obtain ethylene-vinyl alcohol copolymer aqueous dispersions, with the particles in the aqueous dispersions obtained being small in particle diameter, having a high concentration, without causing, during storage, increases in particle diameter due to aggregation of particles or increases in viscosity, and having good long-term storage stability.

As the above-mentioned ethylene/α,β-unsaturated carboxylic acid copolymer, there may be mentioned, for example, such ethylene/α,β-unsaturated carboxylic acid copolymers as ethylene/acrylic acid copolymers, ethylene/methacrylic acid copolymers, ethylene/crotonic acid copolymers, ethylene/maleic acid copolymers, ethylene/fumaric acid copolymers and ethylene/itaconic acid copolymers; and such ethylene/α,β-unsaturated carboxylic acid/α,β-unsaturated carboxylic acid ester copolymers as ethylene/acrylic acid/methyl acrylate copolymers, ethylene/acrylic acid/ethyl acrylate copolymers, ethylene/methacrylic acid/methyl methacrylate copolymers, ethylene/crotonic acid/methyl crotonate copolymers, ethylene/maleic acid/methyl maleate copolymers, ethylene/fumaric acid/methyl fumarate copolymers and ethylene/itaconic acid/methyl itaconate copolymers. Among them, ethylene/acrylic acid copolymers, ethylene/methacrylic acid copolymers and ethylene/acrylic acid/ethyl acrylate copolymers are adequately used in view of their dispersion stabilizing effect.

The content of the α,β-unsaturated carboxylic acid in the above-mentioned ethylene/α,β-unsaturated carboxylic acid copolymer is not particularly restricted but generally is 10 to 30% by weight, preferably 15 to 25% by weight. When the α,β-unsaturated carboxylic acid content is lower than 10% by weight, the dispersion stabilizing effect may possibly become weakened. When the α,β-unsaturated carboxylic acid content is above 30% by weight, the water resistance and gas barrier properties of the coatings obtained from the ethylene/vinyl alcohol copolymer aqueous dispersion may possibly be deteriorated.

The amount to be used of the ethylene/α,β-unsaturated carboxylic acid copolymer is not particularly restricted but generally is 0.01 to 20 parts by weight, preferably 0.05 to 5 parts by weight, per 100 parts by weight of EVOH. When the amount used of the ethylene/α,β-unsaturated carboxylic acid copolymer is smaller than 0.01 part by weight, there is the possibility that no dispersion stabilizing effect can be expected. When the amount used of the ethylene/α,β-unsaturated carboxylic acid copolymer is greater than 20 parts by weight, the step of dispersing is indeed facilitated but the water resistance and gas barrier properties of the coatings obtained from the ethylene/vinyl alcohol copolymer aqueous dispersion may rather be impaired.

The degree of neutralization of the ethylene/α,β-unsaturated carboxylic acid copolymer in neutralization by means of a base is not particularly restricted but generally is 30 to 100 mole percent, preferably 40 to 100 mole percent, more preferably 50 to 100 mole percent, of the carboxyl groups in the ethylene/α,β-unsaturated carboxylic acid copolymer. When the degree of neutralization is lower than 30 mole percent, the quality of the copolymer as a dispersant is reduced, so that it may become difficult to obtain EVOH aqueous dispersions excellent in storage stability. The degree of neutralization of the ethylene/α,β-unsaturated carboxylic acid copolymer so referred to herein can be determined, for example, by determining the unneutralized carboxylic acid content, in a condition such that the compound in question is dissolved in xylene, by neutralization titration with a potassium hydroxide solution in methanol as the solvent.

The base mentioned above is not particularly restricted but generally includes alkali metal hydroxides such as sodium hydroxide and potassium hydroxide, ammonia and organic amines, among others. Among them, alkali metal hydroxides are suitably used in view of the storage stability of the EVOH aqueous dispersion obtained.

As for the method of producing an EVOH dispersion, a dispersing vessel is first charged with EVOH, water and a water-soluble organic solvent so that the concentration of the water-soluble organic solvent may amount to 35 to 95% by weight relative to the total amount of the water and water-soluble organic solvent, if necessary together with a base-neutralized ethylene/α,β-unsaturated carboxylic acid copolymer, and the mixture in the dispersing vessel is heated to a predetermined temperature with stirring to give a solution containing EVOH dissolved therein. The dissolving temperature is desirably 50 to 90° C., preferably 60 to 85° C. Lower dissolving temperatures than 50° C. make it difficult for EVOH to be dissolved. Higher dissolving temperatures than 90° C. are uneconomical since no more temperature effect can be produced. The above-mentioned dissolution is preferably carried out under reflux so that the concentration of the water-soluble organic solvent may be maintained within the range mentioned above. The dispersing vessel may be any container provided with heating means, cooling means, and stirring means capable of exerting a shearing force on the contents; thus, for example, an autoclave equipped with a stirrer may be used.

The solution obtained is then cooled to a temperature not lower than −10° C. but lower than 50° C., preferably not lower than 0° C. and not higher than 30° C., and in the course of cooling, EVOH particles precipitate out without aggregation to give an EVOH dispersion comprising minute particles with an average particle diameter of 0.03 to 0.5 μm. When the cooling temperature is not lower than 50° C., it becomes difficult for EVOH to precipitate out.

The concentration of EVOH on the occasion of EVOH precipitation is preferably adjusted to 1 to 10% by weight, preferably 1 to 7.5% by weight, relative to the total amount of the mixed solvent and EVOH. By controlling the EVOH concentration in the above range, it becomes possible to obtain EVOH dispersions comprising minute particles with an average particle diameter of 0.03 to 0.5 μm. When the EVOH concentration is below 1% by weight, the volumetric efficiency declines and the process becomes no more economical. When the EVOH concentration is above 10% by weight, the dispersibility of EVOH particles on the occasion of precipitation is poor and there arises the possibility that EVOH particles increase in size or aggregate. As the method of adjusting the EVOH concentration in the above range, there may be mentioned, for example, the method comprising dissolving EVOH so that the EVOH concentration may fall within the above range, and the method comprising dissolving EVOH to a concentration higher than the above range and then diluting the resulting solution with a mixed solvent identical in composition to that used on the occasion of dissolution.

It is a characteristic feature of the present invention that the concentration of the water-soluble organic solvent in the EVOH dispersion obtained in the above-mentioned manner is reduced to a level lower than 35% by weight, preferably 1 to 35% by weight, more preferably 10 to 35% by weight, still more preferably 15 to 35% by weight, relative to the total amount of the water and water-soluble organic solvent by adding water and then the water-soluble organic solvent is distilled off. When the concentration of the water-soluble organic solvent is reduced to a level lower than 35% by weight of the above-mentioned total amount, the particles in the dispersion are stabilized on the occasion of distilling off the water-soluble organic solvent. On the contrary, when the concentration of the water-soluble organic solvent in the EVOH dispersion is not lower than 35% by weight relative to the above-mentioned total amount, the particles in the dispersion become unstable and aggregate with one another or become rough and large particles on the occasion of distilling off the water-soluble organic solvent, leading to failure to stably obtain the desired aqueous dispersion. The reason why the particles in the dispersion become stable upon reduction of the concentration of the water-soluble organic solvent to a level lower than 35% by weight relative to the above-mentioned total amount is not clear but it is supposed that the reduction in the concentration of the water-soluble organic solvent results in a condition such that the EVOH can no longer be dissolved in the mixed solvent, so that the particles can be prevented from melting and fusing together on the occasion of distilling off the water-soluble organic solvent.

The method of distilling off the water-soluble organic solvent is not particularly restricted but includes, among others, the method comprising distilling off the solvent by heating and the method comprising distilling off the solvent under reduced pressure. Among them, the method comprising distilling off the solvent by heating is preferably used since that method is simple and can efficiently distil off the solvent at a low cost.

The temperature on the occasion of distilling off the water-soluble organic solvent is desirably 40 to 120° C., preferably 60 to 100° C. When the temperature on the occasion of distilling off is lower than 40° C., a long period of time for distilling off the solvent is uneconomically required. When the temperature on the occasion of distilling off is higher than 120° C., the process becomes uneconomical.

In carrying out the EVOH aqueous dispersion production method of the invention, it is also possible to add an ordinary surfactant and/or protective colloid according to need at levels not defeating the object of the invention. Further, an aqueous dispersion of another resin, a light or heat stabilizer, a pigment, a lubricant, an antifungal agent or a film-forming auxiliary may also be added.

The EVOH solid matter concentration in the aqueous EVOH dispersion obtained in accordance with the invention is generally not lower than 10% by weight, preferably not lower than 15% by weight. The upper limit to the solid matter concentration is not particularly restricted but generally is not higher than 50% by weight, preferably not higher than 40% by weight, since an excessively high concentration may lower the storage stability of the dispersion and increase the viscosity thereof.

The ethylene/vinyl alcohol copolymer aqueous dispersion obtained in accordance with the present invention gives coat films excellent in gas barrier properties, oil resistance and chemical resistance and therefore can be used as or in various antifouling agents, paints, binders, vehicles and so forth. More specifically, it can be used as an agent for imparting gas barrier and odor-retaining properties to food packaging materials and the like; as an antifouling agent for wallpapers and the like; as an agent for imparting chemical resistance, solvent resistance and discoloration resistance to moldings, printed matters and the like; and as an agent for imparting corrosion resistance to steel pipes and other metal goods. Further, it is also possible to collect the ethylene/vinyl alcohol copolymer as a fine-particle powder from the ethylene/vinyl alcohol copolymer aqueous dispersion by spray drying, for instance.

The following examples and comparative examples illustrate the present invention in detail. These examples are, however, by no means limitative of the scope of the invention.

In each example and each comparative example, the following methods were used for carrying out measurements.

(1) Average Particle Diameter

The sample was diluted and dispersed to have a dispersoid concentration of 50 to 100 ppm and the average particle diameter was measured using a dynamic light scattering type particle diameter measuring apparatus (product of Otsuka Electronics Co., Ltd.; DLS700).

(2) Solid Matter Concentration 3 to 4 g portion of the aqueous dispersion (A) was weighed in a foil case (product of Toyo Aluminium Foil Products K.K.; No. 8) having a known weight, and dried by heating at 130° C. for 1.5 hours in a hot air drier (product of Advantec; FV-320). Then, the weight of the residual solid (B) was measured, and the solid matter concentration was calculated as follows:

Solid matter concentration=$(B/A)\times 100$

In each example and each comparative example, the concentration of water-soluble organic solvent such as methyl alcohol was expressed in terms of percent by weight relative to the total amount of water and the water-soluble organic solvent.

EXAMPLE 1

To an ethylene/acrylic acid copolymer (acrylic acid content: 21% by weight) were added water and an amount of sodium hydroxide just sufficient to neutralize 100 mole percent of the acrylic acid, and dissolution was allowed to proceed at 95° C. for 4 hours to give an aqueous solution of the neutralized ethylene/acrylic acid copolymer with a concentration of 25% by weight.

A dispersing vessel was charged with 8 parts by weight of the neutralized ethylene/acrylic acid copolymer aqueous solution obtained in the above manner, 100 parts by weight of the saponified substance of an ethylene/vinyl acetate copolymer (ethylene content: 32 mole percent, degree of saponification: 99.5 mole percent, degree of polymerization: 1000), 935 parts by weight of methyl alcohol and 503 parts by weight of water (methyl alcohol concentration: 65% by weight), the mixture was heated to 70° C. and dissolution was effected under reflux.

The solution obtained was cooled to 5° C. with stirring to allow particles to precipitate out and be dispersed, whereby an ethylene/vinyl alcohol copolymer dispersion was obtained. Then, 1678 parts by weight of water was added to the ethylene/vinyl alcohol copolymer dispersion obtained (to reduce the methyl alcohol concentration to 30% by weight). Thereafter, the temperature was raised to 100° C. and the methyl alcohol in the mixed solvent was distilled off by heating to give an ethylene/vinyl alcohol copolymer aqueous dispersion with an average particle diameter of 0.20 μm and a solid matter concentration of 32% by weight. The ethylene/vinyl alcohol copolymer aqueous dispersion obtained was allowed to stand at 40° C. for 180 days; no aggregation was observed and the storage stability was good.

EXAMPLE 2

The procedure of Example 1 was followed in the same manner except that 855 parts by weight of isopropyl alcohol and 743 parts by weight of water were used in lieu of 935 parts by weight of methyl alcohol and 503 parts by weight of water (isopropyl alcohol concentration: 45% by weight) and that the amount of water added before distilling off the solvent by heating was changed to 1520 parts by weight (isopropyl alcohol concentration: 25% by weight) to give an ethylene/vinyl alcohol copolymer aqueous dispersion with an average particle diameter of 0.15 μm and a solid matter concentration of 31% by weight. The ethylene/vinyl alcohol copolymer aqueous dispersion obtained was allowed to stand at 40° C. for 180 days; no aggregation was observed and the storage stability was good.

EXAMPLE 3

The procedure of Example 1 was followed in the same manner except that 1045 parts by weight of methyl alcohol, 255 parts by weight of tert-butyl alcohol and 849 parts by weight of water were used in lieu of 935 parts by weight of methyl alcohol and 503 parts by weight of water (total concentration of methyl alcohol and tert-butyl alcohol: 60% by weight) and that the amount of water added before distilling off the solvent by heating was changed to 2426 parts by weight (total concentration of methyl alcohol and tert-butyl alcohol: 28% by weight) to give an ethylene/vinyl alcohol copolymer aqueous dispersion with an average particle diameter of 0.20 μm and a solid matter concentration of 31% by weight. The ethylene/vinyl alcohol copolymer aqueous dispersion obtained was allowed to stand at 40° C. for 180 days; no aggregation was observed and the storage stability was good.

EXAMPLE 4

The procedure of Example 1 was followed in the same manner except that 1792 parts by weight of methyl alcohol and 965 parts by weight of water were used in lieu of 935 parts by weight of methyl alcohol and 503 parts by weight of water (methyl alcohol concentration: 65% by weight) and that the amount of water added before distilling off the solvent by heating was changed to 3217 parts by weight (methyl alcohol concentration: 30% by weight) to give an ethylene/vinyl alcohol copolymer aqueous dispersion with an average particle diameter of 0.06 μm and a solid matter concentration of 28% by weight. The ethylene/vinyl alcohol copolymer aqueous dispersion obtained was allowed to stand at 40° C. for 180 days; no aggregation was observed and the storage stability was good.

EXAMPLE 5

To an ethylene/acrylic acid copolymer (acrylic acid content: 21% by weight) were added water and an amount of sodium hydroxide just sufficient to neutralize 60 mole percent of the acrylic acid, and dissolution was allowed to proceed at 95° C. for 4 hours to give an aqueous solution of the neutralized ethylene/acrylic acid copolymer with a concentration of 25% by weight.

A dispersing vessel was charged with 8 parts by weight of the neutralized ethylene/acrylic acid copolymer aqueous solution obtained in the above manner, 100 parts by weight of the saponified substance of an ethylene/vinyl acetate copolymer (ethylene content: 47 mole percent, degree of saponification: 99.5 mole percent, degree of polymerization: 1000), 1804 parts by weight of methyl alcohol and 318 parts by weight of water (methyl alcohol concentration: 85% by weight), the mixture was heated to 70° C. and dissolution was effected under reflux.

The solution obtained was cooled to 5° C. with stirring to allow particles to precipitate out and be dispersed, whereby an ethylene/vinyl alcohol copolymer dispersion was obtained. Then, 3224 parts by weight of water was added to the ethylene/vinyl alcohol copolymer dispersion obtained (methyl alcohol concentration: 34% by weight). Thereafter, the temperature was raised to 100° C. and the methyl alcohol in the mixed solvent was distilled off by heating to give an ethylene/vinyl alcohol copolymer aqueous dispersion with an average particle diameter of 0.20 μm and a solid matter concentration of 31% by weight. The ethylene/vinyl alcohol copolymer aqueous dispersion obtained was allowed to stand at 40° C. for 180 days; no aggregation was observed and the storage stability was good.

COMPARATIVE EXAMPLE 1

To an ethylene/acrylic acid copolymer (acrylic acid content: 21% by weight) were added water and an amount of sodium hydroxide just sufficient to neutralize 100 mole percent of the acrylic acid, and dissolution was allowed to proceed at 95° C. for 4 hours to give an aqueous solution of the neutralized ethylene/acrylic acid copolymer with a concentration of 25% by weight.

A dispersing vessel was charged with 8 parts by weight of the neutralized ethylene/acrylic acid copolymer aqueous solution obtained as described above, 100 parts by weight of the saponified substance of an ethylene/vinyl acetate copolymer (ethylene content: 32 mole percent, degree of saponification: 99.5 mole percent, degree of saponification: 1000), 637 parts by weight of methyl alcohol and 1486 parts by weight of water (methyl alcohol concentration: 30% by weight), the mixture was heated to 70° C. and refluxed: the saponified substance of the ethylene/vinyl acetate copolymer was not dissolved.

COMPARATIVE EXAMPLE 2

The procedure of Example 1 was followed in the same manner except that the amount of water added before distilling off methyl alcohol by heating was changed to 1085 parts by weight (methyl alcohol concentration: 37% by weight), and in the step of distilling off the methyl alcohol in the mixed solvent by heating, the resin particles began to fuse together to form aggregates at a temperature exceeding about 50° C.; thus, no ethylene/vinyl alcohol copolymer aqueous dispersion could be obtained.

INDUSTRIAL APPLICABILITY OF THE INVENTION

In accordance with the present invention, ethylene/vinyl alcohol copolymer aqueous dispersions which has a high concentration and is excellent in long-term storage stability and in which the resin particles in the aqueous dispersion obtained are small in particle diameter can be produced in an industrially advantageous manner.

The invention claimed is:

1. A method of producing an ethylene/vinyl alcohol copolymer aqueous dispersion, which comprises:
   (1) a step of dissolving an ethylene/vinyl alcohol copolymer in a mixed solvent comprising 5 to 65% by weight of water and 35 to 95% by weight of a water-soluble organic solvent, with heating, wherein the mixed solvent contains an ethylene/α,β-unsaturated carboxylic acid copolymer neutralized with a base,
   (2) a step of cooling a solution obtained in said step (1) to precipitate the ethylene/vinyl alcohol copolymer,
   (3) a step of reducing a concentration of the water-soluble organic solvent in said mixed solvent to a level not higher than 28% by weight relative to the total amount of the water and water-soluble organic solvent by adding water, and
   (4) a step of distilling off said water-soluble organic solvent by heating to a temperature of 60° C. to 120° C.,
   wherein a solid matter concentration in the ethylene/vinyl alcohol copolymer aqueous dispersion obtained is not lower than 15% by weight.

2. The method of producing an ethylene/vinyl alcohol copolymer aqueous dispersion according to claim 1,
   wherein the ethylene/vinyl alcohol copolymer has an ethylene content of 15 to 65 mole percent and a degree of saponification of not lower than 80 mole percent.

3. The method of producing an ethylene/vinyl alcohol copolymer aqueous dispersion according to claim 2,
   wherein the water-soluble organic solvent is at least one species selected from the group consisting of methyl alcohol, ethyl alcohol, n-propyl alcohol, isopropyl alcohol and tert-butyl alcohol.

4. The method of producing an ethylene/vinyl alcohol copolymer aqueous dispersion according to claim 1,
   wherein the water-soluble organic solvent is at least one species selected from the group consisting of methyl alcohol, ethyl alcohol, n-propyl alcohol, isopropyl alcohol and tert-butyl alcohol.

5. The method of producing an ethylene/vinyl alcohol copolymer aqueous dispersion according to claim 1,
   wherein the ethylene/α,β-unsaturated carboxylic acid copolymer is an ethylene/acrylic acid copolymer, an ethylene/methacrylic acid copolymer or an ethylene/acrylic acid/ethyl acrylate copolymer.

6. The method of producing an ethylene/vinyl alcohol copolymer aqueous dispersion according to claim 5,
   wherein the ethylene/α,β-unsaturated carboxylic acid copolymer is used in an amount of 0.01 to 20 parts by weight per 100 parts by weight of the ethylene/vinyl alcohol copolymer.

7. The method of producing an ethylene/vinyl alcohol copolymer aqueous dispersion according to claim 1, wherein the ethylene/α,β-unsaturated carboxylic acid copolymer is used in an amount of 0.01 to 20 parts by weight per 100 parts by weight of the ethylene/vinyl alcohol copolymer.

* * * * *